US012711653B2

(12) United States Patent
Vogel

(10) Patent No.: US 12,711,653 B2
(45) Date of Patent: Aug. 18, 2026

(54) COMPUTER-IMPLEMENTED METHOD FOR ASCERTAINING A POSITION OF A MOTOR VEHICLE OR AN OBJECT

(71) Applicant: Dr. Ing. h. c. F. Porsche AG, Stuttgart (DE)

(72) Inventor: Manuel Vogel, Schweighofen (DE)

(73) Assignee: DR. ING. H. C. F. PORSCHE AKTIENGESLLSCHAFT, Stuttgart (DE)

( * ) Notice: Subject to any disclaimer, the term of this patent is extended or adjusted under 35 U.S.C. 154(b) by 237 days.

(21) Appl. No.: 18/648,415

(22) Filed: Apr. 28, 2024

(65) Prior Publication Data

US 2024/0371026 A1 Nov. 7, 2024

(30) Foreign Application Priority Data

May 5, 2023 (DE) ..................... 10 2023 111 768.8

(51) Int. Cl.

*G06T 7/70* (2017.01)
*G06T 7/60* (2017.01)
*G06V 10/60* (2022.01)
*G06V 20/58* (2022.01)

(52) U.S. Cl.

CPC .................. *G06T 7/70* (2017.01); *G06T 7/60* (2013.01); *G06V 10/60* (2022.01); *G06V 20/58* (2022.01); *G06T 2207/30252* (2013.01); *G06V 2201/08* (2022.01)

(58) Field of Classification Search

CPC ... G06T 7/70; G06T 7/60; G06T 2207/30252; G06T 7/74; G06V 10/60; G06V 20/58; G06V 2201/08

See application file for complete search history.

(56) References Cited

U.S. PATENT DOCUMENTS 8,232,872 B2 7/2012 Zeng
2021/0012121 A1* 1/2021 Urabe .................... G06V 20/58

FOREIGN PATENT DOCUMENTS

DE 10 2017 200 146 7/2018
DE 10 2017 223 284 6/2019
DE 10 2020 115 778 12/2021

* cited by examiner

*Primary Examiner* — Jonathan A Boyd

(74) *Attorney, Agent, or Firm* — LEYDIG, VOIT & MAYER, LTD.

(57) ABSTRACT

A computer-implemented method is provided for ascertaining a position of a motor vehicle (1; 4) or of an object (2). The method includes: optically recording data of a traffic environment having multiple motor vehicles (1; 2; 4); detecting a reflection (3; 5) of at least a portion of a specific one of the motor vehicles (1; 2; 4) on the object (2) in the data; ascertaining at least one prominent area of the specific motor vehicle (1; 4) in the reflection; and ascertaining the position of the specific motor vehicle (1; 4) or of the object (2) using the prominent area in the reflection (3; 5).

18 Claims, 4 Drawing Sheets

COMPUTER-IMPLEMENTED METHOD FOR ASCERTAINING A POSITION OF A MOTOR VEHICLE OR AN OBJECT

CROSS-REFERENCE TO RELATED APPLICATION

This application claims priority on German Patent Application No 10 2023 111 768.8 filed May 5, 2023, the entire disclosure of which is incorporated herein by reference.

FIELD OF THE INVENTION

The invention relates to a computer-implemented method for ascertaining a position of a motor vehicle or an object.

BACKGROUND OF THE INVENTION

Methods that use using lidar or radar to ascertain a distance between two motor vehicles are known in the prior art. For example, DE 10 2014 224 762 A1 discloses a method that detects reflections on reflective surfaces and records a polarized image and an unfiltered image. The reflections are ascertained by comparing the images, and areas of the environment that cannot be seen directly can then be ascertained.

In contrast, an object of the present invention is to enable position ascertainment in a more straightforward manner.

SUMMARY OF THE INVENTION

A method for ascertaining a position of a motor vehicle or an object comprises optically recording data of a traffic environment having multiple motor vehicles. In this context, the data can comprise single images or videos. The optical recording can, be performed using a camera, and the camera can be a component of one of the motor vehicles. In the context of this description, the traffic environment is understood to mean a motor vehicle road along with the adjacent areas, e.g. sidewalks and/or buildings.

A reflection of a portion of a specific one of the motor vehicles on the object is detected in the data, and a prominent area of the specific motor vehicle is ascertained in the reflection. In the scope of this description, a "prominent area" is understood to mean an area with significant visual differences from adjacent neighboring areas. This can, e.g., be a lighting element, such as a turn signal, a rear light, a headlamp, a brake light, a number plate or an exterior mirror. It is also possible that multiple prominent areas of the specific motor vehicle are ascertained in the reflection. In this case, all of the subsequent explanations with reference to the prominent area will apply to the plural prominent areas.

The position of the specific motor vehicle or object is ascertained by way of the prominent area in the reflection. This simplifies the method because the prominent area is particularly easy to ascertain. To ascertain the position, information about the surface or about the specific motor vehicle can, e.g., be retrieved from a database by means of the reflection. The information can include information about an orientation and position of the prominent area. The information and the ascertained prominent area can be used to ascertain the position of the specific motor vehicle and/or the object.

It is possible that only the prominent area is used to ascertain the position based on the data. In this case, however, additional information that is not part of the optically recorded data can also be used to ascertain the position.

According to one embodiment, the object can be one of the vehicles. Alternatively, the object can also be a reflective surface, e.g. a glass pane.

According to one embodiment, the prominent area can differ more visually from the first neighboring areas adjacent to the prominent areas than other areas of the specific motor vehicle differ from the second neighboring area adjacent to the other areas. For example, the prominent area can differ more in color from the first neighboring areas. It is also possible that the prominent area differs more from the first neighboring areas due to a position or due to its surface orientation than the other areas differ from the second neighboring areas. It is also possible that the prominent area illuminates or projects more from the first neighboring areas than the other areas illuminate or project from the second neighboring areas.

According to some embodiments, the optical data can be recorded by a camera of a camera motor vehicle. The camera motor vehicle can in this case be one of the motor vehicles, and the specific motor vehicle can be distinct from the camera motor vehicle. In this case, the position of the specific motor vehicle relative to the camera motor vehicle can be ascertained. It is particularly advantageous to detect the distance from the camera motor vehicle to the specific motor vehicle if the method is intended to be used in the context of semi-automatic or fully-automatic control of the camera motor vehicle. The distance can be ascertained more precisely by this method than by optically recorded data alone, without consideration of the reflection.

The data can be recorded by a camera of the specific motor vehicle, and the position of the specific motor vehicle relative to the object can be ascertained.

According to one embodiment, information about an outer surface of the object can be retrieved from a database. The information can be used in ascertaining the position of the specific motor vehicle or object. Retrieval of the information can be performed via a wireless internet connection.

According to one embodiment, the reflection can have been detected on the outer surface.

In some embodiments, plural different geometrical transformations of the specific motor vehicle can be simulated. In addition, only the outer surface of the specific motor vehicle, or only the prominent area can be simulated. In this context, a geometrical transformation is understood to mean the movement of a number of points within a space imagined to be at rest. Examples of geometric transformations include: translation, rotation, reflection, stretching, and combinations thereof.

The simulated geometric transformations are compared to the reflection for differences, particularly with respect to the prominent area. Differences can include a location, size, and/or orientation of the prominent area. The simulated geometric transformation having the fewest differences is selected as the appropriate geometric transformation. The appropriate geometric transformation is used to ascertain the position of the specific motor vehicle. A conclusion about the position of the specific motor vehicle can be drawn by means of the appropriate geometric transformation.

According to one embodiment, multiple reflections of at least a portion of the specific motor vehicle on various of the motor vehicles can be detected in the optical data. The prominent area of the specific motor vehicle can be ascertained in the reflections. The position of the specific motor vehicle can be ascertained using the prominent area in the reflections. The position of the specific motor vehicle can also be ascertained by the multiple reflections if the position of the object is not known. Various constraints can be established from the multiple reflections, based on which exactly one unique position of the specific motor vehicle can be ascertained given a sufficient number of reflections.

The system of the invention comprises a digital electronic storage medium and a digital electronic processing unit. The processing unit can also be referred to as a processor. The digital electronic processing unit may be understood in connection with this disclosure to include a machine or electronic circuitry or a high-performance computer, for example. In particular, the digital electronic processing unit may comprise a master processor (central processing unit (CPU)), a microprocessor, or a microcontroller, for example an application-specific integrated circuit or a digital signal processor, optionally in combination with a memory unit for storing program instructions, as well as storing component attributes across components and the test attributes across tests. The digital electronic processing unit may also be understood to mean or comprise a virtualized processor, a virtual machine, or a soft CPU. For example, the digital electronic processing unit may also be or comprise a programmable processor equipped with configuration steps for carrying out the method described herein or configured with configuration steps in such a way that the programmable processor realizes the features of the method and system described herein. In addition, highly parallel computing units and high-performance graphics modules may be provided. A digital electronic storage medium may, for example, be understood in connection with this disclosure to mean a non-volatile memory in the form of a flash memory (Flash EEPROM) or a permanent memory, such as a hard drive Instructions are stored in the storage medium. The processing unit is designed to read out and execute the instructions. The instructions are designed such that, when the instructions are executed, the processing unit is prompted to perform a method as described herein.

Further features and advantages of the invention will become apparent from the following description of preferred embodiments, with reference to the appended drawings. The same reference signs are used for the same or similar features and for features having the same or similar functions.

DETAILED DESCRIPTION

Figure 1:
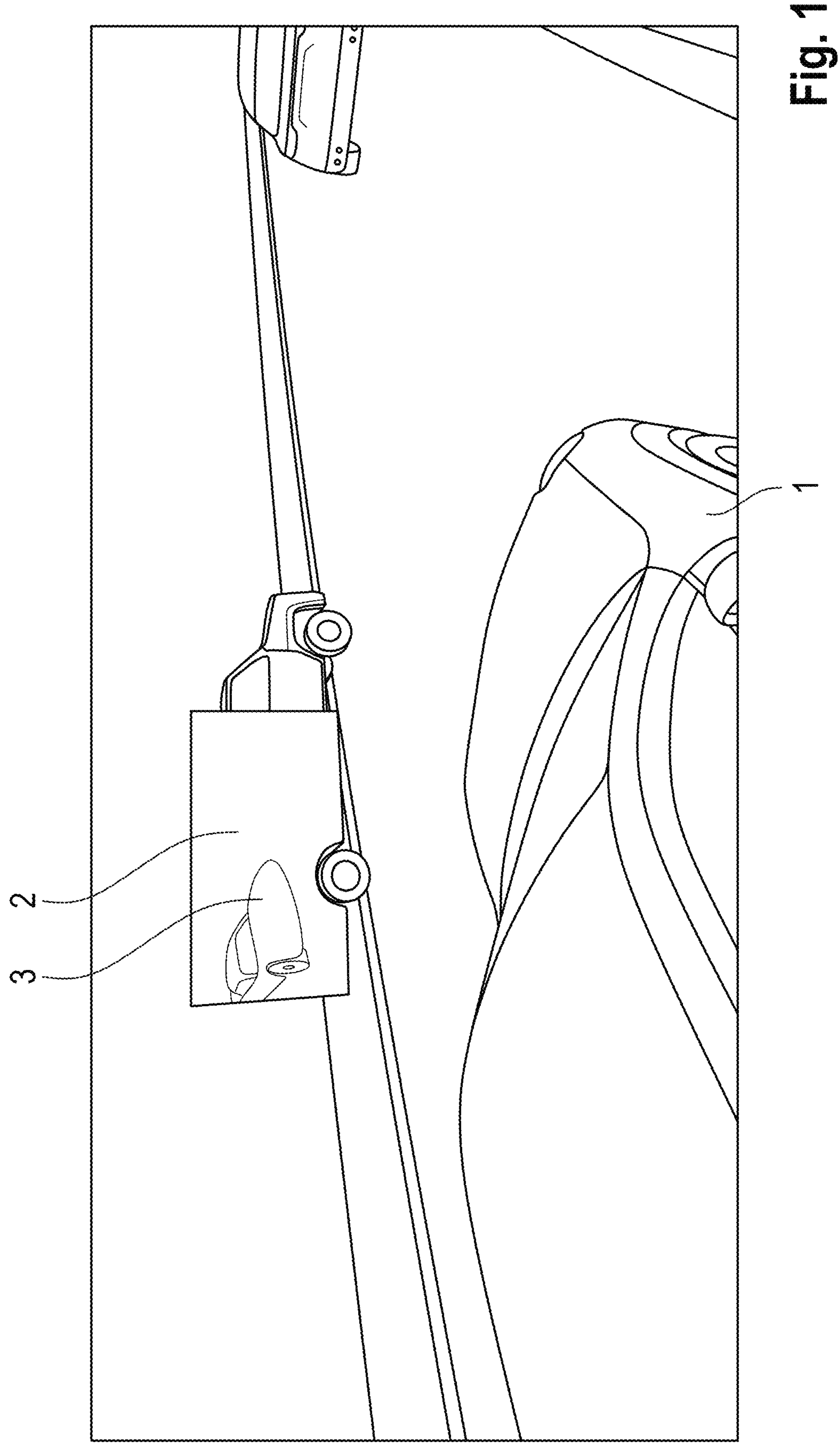
FIG. 1 is a schematic perspective view of a traffic environment including a specific motor vehicle and an object in the form of a motor vehicle, the surface of which reflects the specific motor vehicle.

In the traffic environment illustrated in FIG. 1, the specific motor vehicle 1 is reflected in a further motor vehicle 2, which represents the object in the context of the description above. The specific motor vehicle could be reflected on another reflective surface instead of on the surface of the further motor vehicle 2.

To ascertain the position of the further motor vehicle 2 relative to the specific motor vehicle 1, a prominent area is detected in the reflection 3 of the specific motor vehicle. The prominent area can be a mirror or a front headlamp module. When such a prominent area is detected, information about the appearance of the prominent area of the specific motor vehicle 1 is loaded from a database.

Thereafter, a geometric transformation is sought that, when applied to the information loaded from the database, generates an image having particularly few differences from the reflection 3 of the prominent area. The transformation can, e.g., be selected from a number of geometric transformations, and the geometric transformation can be the one differing least from the reflection 3 of the prominent area.

If multiple prominent areas are being detected, then the position of the specific motor vehicle 1 relative to the object 2 can also be ascertained by using geometric methods instead of selecting a geometric transformation.

Figure 2:
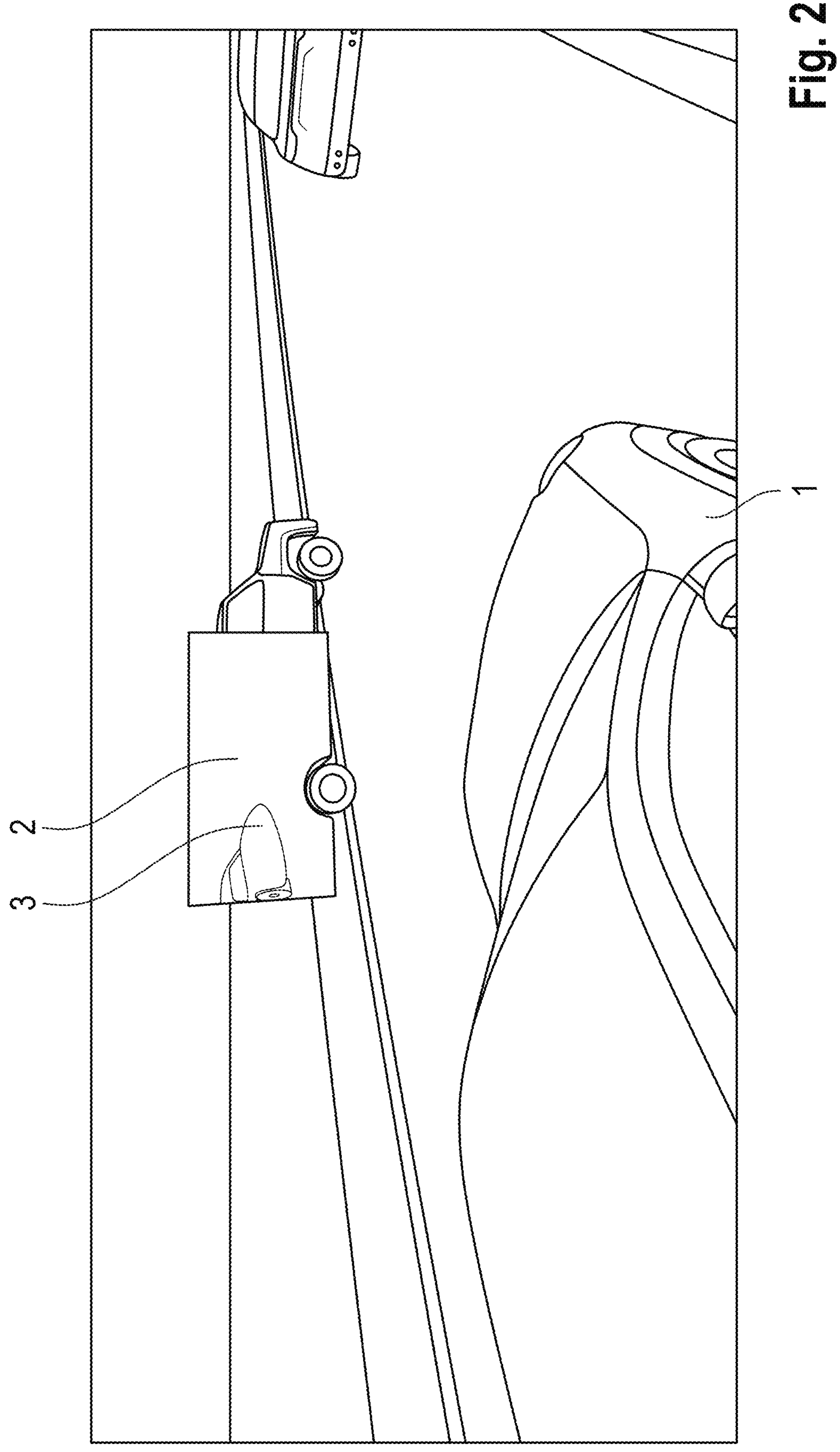
FIG. 2 is a schematic perspective view of the traffic environment of FIG. 1, wherein the object has altered its position.

FIGS. 1 and 2 collectively show that the entire reflection 3 changes as a function of the position of the further motor vehicle 2. Of course, this also applies to the prominent area. Thus, the position of the specific motor vehicle 1 relative to the further motor vehicle 2 can be ascertained based on the reflection 3 of the prominent area.

Figure 3:
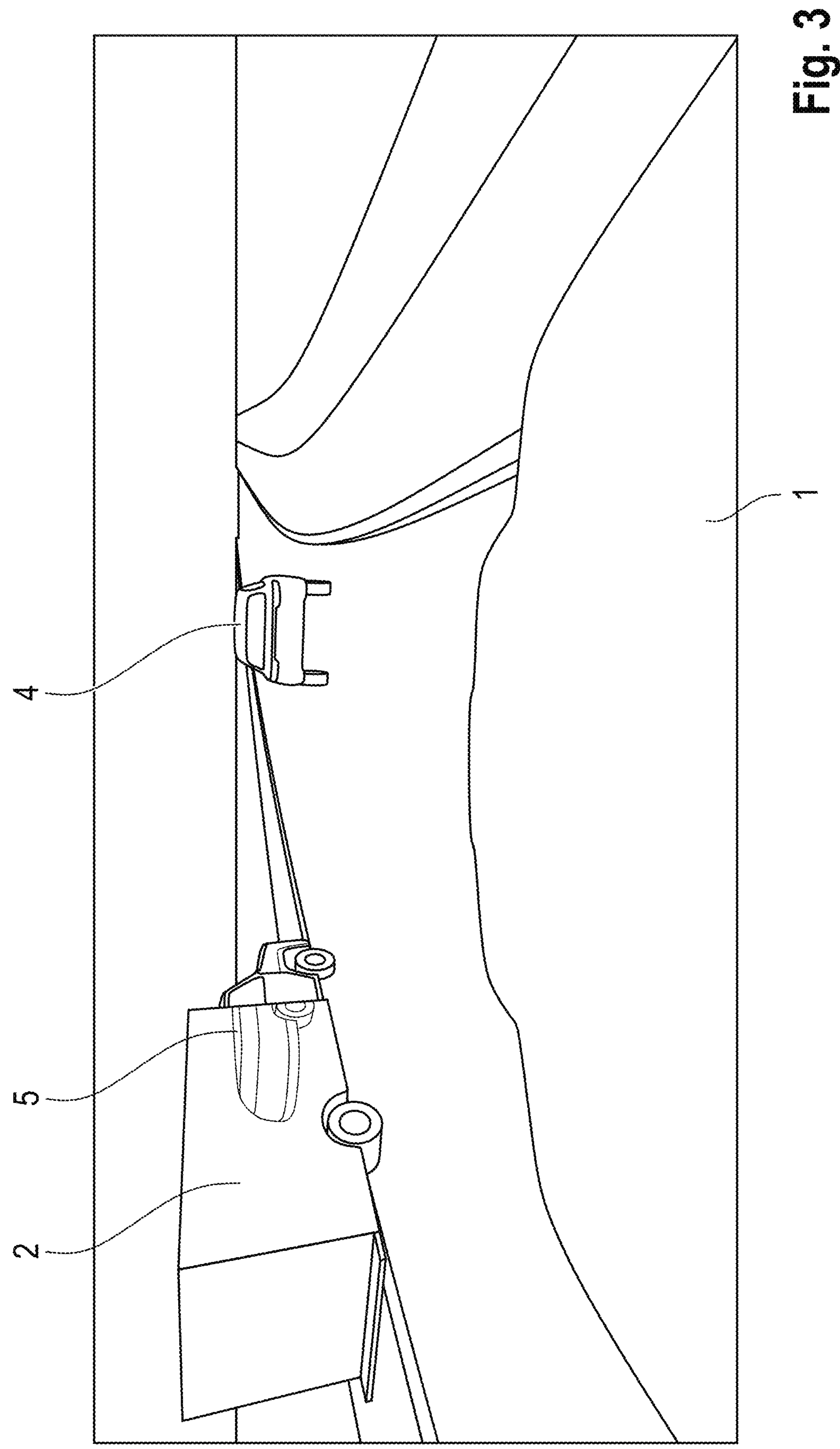
FIG. 3 is a schematic perspective view of a traffic environment including a camera motor vehicle, a specific motor vehicle, and an object, on the surface of which the specific motor vehicle is reflected.

In the traffic environment shown in FIG. 3, the reflection 5 of a specific motor vehicle 4 in the further motor vehicle 2 is used to ascertain the position of the specific motor vehicle 4 relative to a camera motor vehicle 1. The camera motor vehicle 1 optically records data using a camera. The reflection 5 is detected in these optically recorded data. A prominent area is ascertained in the reflection 5 and—similar to that explained with respect to FIGS. 1 and 2—ascertained to determine the position of the specific motor vehicle 4 relative to the camera motor vehicle 1.

Figure 4:
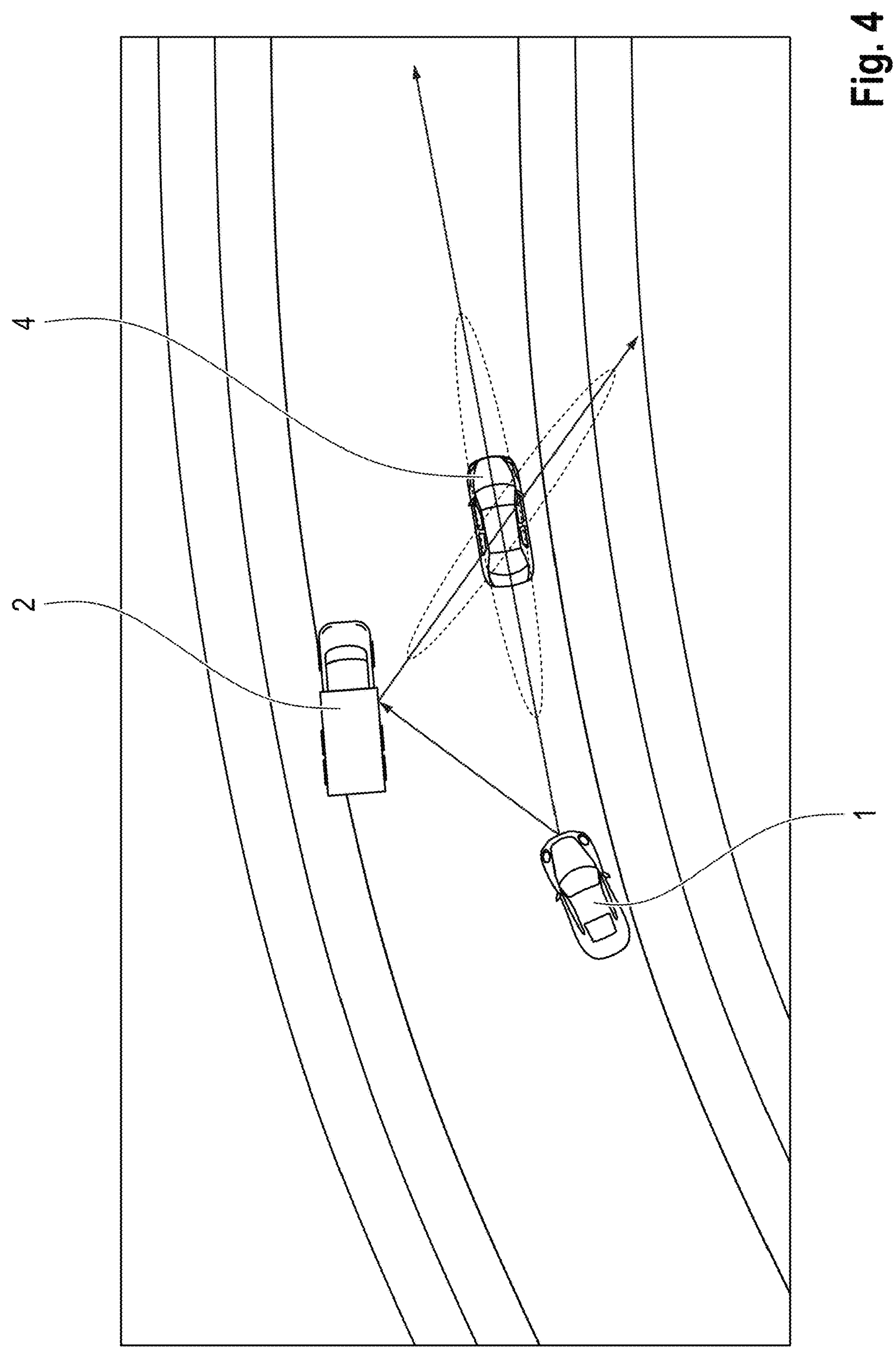
FIG. 4 is a schematic overhead view of the traffic environment of FIG. 3.

As can be seen in FIG. 4, the reflection 5 in the further motor vehicle 2 can be used to determine more precisely the position of the specific motor vehicle 4. For this purpose, the distance between the specific motor vehicle 4 and the camera motor vehicle 1 can be ascertained by using a method known from the prior art, without using the reflection. In addition, the reflection 5 can be used to determine the position, as described above. The position of the specific motor vehicle 4 can be ascertained particularly precisely based on this combination.

The invention claimed is:

1. A computer-implemented method for ascertaining a position of a motor vehicle or of an object, the method comprising:

- optically recording data of a traffic environment having multiple motor vehicles;
- detecting a reflection of at least a portion of a specific one of the motor vehicles in the object in the data;
- ascertaining at least one prominent area of the specific motor vehicle in the reflection;
- simulating a plurality of different geometrical transformations of the specific motor vehicle or of the prominent area;
- comparing the plurality of different simulated geometric transformations with the reflection with respect to differences;
- selecting a simulated geometrical transformation having the fewest differences as an appropriate geometrical transformation; and ascertaining the position of the specific motor vehicle or the object using the prominent area in the reflection and the appropriate geometric transformation.

2. The method of claim 1, wherein the object is one of the motor vehicles.

3. The method of claim 1, wherein the prominent area differs more visually from a first neighboring area adjacent to the prominent area than other areas of the specific motor vehicle differ from a second neighboring area adjacent to the other areas.

4. The method of claim 1, wherein the optically recorded data are recorded by a camera of a camera motor vehicle that is one of the motor vehicles, and wherein the specific motor vehicle is distinct from the camera motor vehicle.

5. The method of claim 1, wherein the optical data are recorded by a camera of the specific motor vehicle.

6. The method of claim 1, further comprising retrieving information about an outer surface of the object, and using the retrieved information in ascertaining the position of the specific motor vehicle or of the object.

7. The method of claim 6, wherein the reflection was detected on the outer surface.

8. The method of claim 1, further comprising detecting in the optical data multiple reflections of at least the portion of the specific motor vehicle on a number of the motor vehicles; ascertaining the prominent area of the specific motor vehicle in the reflections; and ascertaining the position of the specific motor vehicle by way of the prominent area in the reflections.

9. The method of claim 1, wherein the optically recorded data comprises single images or videos.

10. The method of claim 1, wherein the object is a reflective surface.

11. A system comprising a digital electronic storage medium and a digital electronic processing unit, wherein instructions are stored in the storage medium, wherein the processing unit is designed to read out and execute the instructions, wherein the instructions are designed such that, when the instructions are executed, the processing unit is prompted to perform a method for ascertaining a position of a motor vehicle or of an object, the method comprising:

optically recording data of a traffic environment having multiple motor vehicles;

detecting a reflection of at least a portion of a specific one of the motor vehicles in the object in the data;

ascertaining at least one prominent area of the specific motor vehicle in the reflection;

simulating a plurality of different geometrical transformations of the specific motor vehicle or of the prominent area;

comparing the plurality of different simulated geometric transformations with the reflection with respect to differences;

selecting a simulated geometrical transformation having the fewest differences as an appropriate geometrical transformation; and ascertaining the position of the specific motor vehicle or the object using the prominent area in the reflection and the appropriate geometric transformation.

12. The system of claim 11, wherein the object is one of the motor vehicles.

13. The system of claim 11, wherein the prominent area differs more visually from a first neighboring area adjacent to the prominent area than other areas of the specific motor vehicle differ from a second neighboring area adjacent to the other areas.

14. The system of claim 11, wherein the optically recorded data are recorded by a camera of a camera motor vehicle that is one of the motor vehicles, and wherein the specific motor vehicle is distinct from the camera motor vehicle.

15. The system of claim 11, wherein the optical data are recorded by a camera of the specific motor vehicle.

16. The system of claim 11, wherein the instructions are configured such that the method further comprises retrieving information about an outer surface of the object, and using the retrieved information in ascertaining the position of the specific motor vehicle or of the object.

17. The system of claim 16, wherein the reflection was detected on the outer surface.

18. The system of claim 11, wherein the instructions are configured such that the method further comprises detecting in the optical data multiple reflections of at least the portion of the specific motor vehicle on a number of the motor vehicles; ascertaining the prominent area of the specific motor vehicle in the reflections; and ascertaining the position of the specific motor vehicle by way of the prominent area in the reflections.

* * * * *